United States Patent
Lee et al.

(10) Patent No.: US 9,600,984 B2
(45) Date of Patent: Mar. 21, 2017

(54) METHOD AND DEVICE FOR GENERATING VIBRATION BY USING ADJECTIVE SPACE ON A TIMELINE

(71) Applicants:Samsung Electronics Co., Ltd., Gyeonggi-do (KR); Postech Academy-Industry-Foundation, Gyeongsangbuk-do (KR)

(72) Inventors: Eun-hwa Lee, Gyeonggi-do (KR); Seung-moon Choi, Gyeongsangbuk-do (KR); Jae-bong Lee, Gyeongsangbuk-do (KR); Yong-jae Yoo, Gyeongsangbuk-do (KR); Jeong-seok Lee, Gyeonggi-do (KR); Dae-kwang Jung, Gyeonggi-do (KR); Yu-dong Bae, Gyeonggi-do (KR)

(73) Assignees: Samsung Electronics Co., Ltd (KR); Postech Academy-Industry Foundation (KR)

( * ) Notice: Subject to any disclaimer, the term of this patent is extended or adjusted under 35 U.S.C. 154(b) by 40 days.

(21) Appl. No.: 14/612,769

(22) Filed: Feb. 3, 2015

(65) Prior Publication Data

US 2015/0235531 A1    Aug. 20, 2015

(30) Foreign Application Priority Data

Feb. 3, 2014  (KR) ........................ 10-2014-0012213

(51) Int. Cl.
G08B 21/00    (2006.01)
G08B 6/00    (2006.01)
G06F 3/01    (2006.01)

(52) U.S. Cl.
CPC ............... *G08B 6/00* (2013.01); *G06F 3/016* (2013.01)

(58) Field of Classification Search
CPC ....................................................... G08B 6/00
USPC ... 340/407.1, 407.2; 345/156, 163, 168, 173
See application file for complete search history.

(56) References Cited

U.S. PATENT DOCUMENTS 8,138,408 B2    3/2012  Jung et al.
2011/0048213 A1    3/2011  Choi et al.

FOREIGN PATENT DOCUMENTS

| KR | 10-0807738 | 2/2008 |
|---|---|---|
| KR | 10-2010-0125219 | 11/2010 |
| KR | 10-2010-0125804 | 12/2010 |
| KR | 10-2011-0076283 | 7/2011 |

*Primary Examiner* — Jeffery Hofsass
(74) *Attorney, Agent, or Firm* — The Farrell Law Firm, P.C.

(57) ABSTRACT

A method, device, and non-transitory computer-readable storage medium for generating a vibration from an adjective space are provided. The method includes providing an at least one-dimensional adjective space, inputting data to the at least one-dimensional adjective space based on a user input, and generating a vibration element vibration based on the data input to the at least one-dimensional adjective space. The device includes a control unit configured to provide an at least one-dimensional adjective space; and a user input unit configured to receive data input to the at least one-dimensional adjective space, wherein the control unit is further configured to generate a vibration element based on the data input to the at least one-dimensional adjective space.

9 Claims, 12 Drawing Sheets

METHOD AND DEVICE FOR GENERATING VIBRATION BY USING ADJECTIVE SPACE ON A TIMELINE

PRIORITY

This application claims priority under 35 U.S.C. §119(a) to a Korean Patent Application filed on Feb. 3, 2014 in the Korean Intellectual Property Office and assigned Serial No. 10-2014-0012213, the entire contents of which are incorporated herein by reference.

BACKGROUND

1. Field of the Invention

The present invention relates generally to a method and device for generating a vibration from an adjective space, and more particularly, to a method and device for generating a vibration from an adjective space that is displayed as a visual object on a timeline.

2. Description of the Related Art

Among various types of haptic feedback, a haptic feedback using vibration (hereinafter referred to as a vibration feedback) is widely applied to various mobile devices such as smartphones and tablet Personal Computers (PCs), game machines, and realistic cinemas. Also, vibration feedback is relatively efficient in comparison to other types of feedback, where the frequency of use of vibration feedback is increasing.

However, a method of directly setting a frequency and an amplitude, which are the physical characteristics of a vibration waveform, is mainly used. Vibration generation technologies which use an intuitive input method and a visual or auditory feedback method have been developed for generating a vibration feedback, but they have a limitation in that a frequency and amplitude are changed by an expression means represented by a graph, a figure, or a musical note. That is, it is difficult for a user, who is not expert at generating a vibration pattern, to experience a vibration of a feeling desired by the user from a device.

Therefore, technology for intuitively generating a vibration stimulation and pattern is needed in order for a user, who is not an expert at generating a vibration pattern, to accurately experience a vibration of a feeling desired by the user.

SUMMARY

The present invention has been made to address the above-mentioned problems and disadvantages, and to provide at least the advantages described below. Accordingly, an aspect of the present invention provides a method in which a user easily and intuitively generates a vibration pattern desired by the user.

Another aspect of the present invention provides a vibration generation method of generating a vibration without using a frequency and amplitude of the vibration, based on data input to an adjective space that expresses a cognitive feeling actually felt by a person.

In accordance with an aspect of the present invention, a method of generating a vibration from an adjective space by a device is provided. The method includes providing an at least one-dimensional adjective space; inputting data to the adjective space, based on a user input; and generating an element vibration, based on the data input to the at least one-dimensional adjective space; inputting data to the at least one-dimensional adjective space based on a first user input; and generating a vibration element based on the data input to the at least one-dimensional adjective space.

In accordance with another aspect of the present invention, a device for generating a vibration from an adjective space is provided. The device includes a control unit configured to provide an at least one-dimensional adjective space; and a user input unit configured to receive data input to the at least one-dimensional adjective space, wherein the control unit is further configured to generate a vibration element based on the data input to the at least one-dimensional adjective space.

In accordance with another aspect of the present invention, a non-transitory computer-readable storage medium storing one or more programs including instructions for executing a method in which a device generates a vibration from an adjective space is provided. The method includes providing an at least one-dimensional adjective space; inputting data to the at least one-dimensional adjective space based on a user input; and generating a vibration element based on the data input to the at least one-dimensional adjective space.

BRIEF DESCRIPTION OF THE DRAWINGS

The above and other aspects, features, and advantages of the present invention will be more apparent from the following description, taken in conjunction with the accompanying drawings, in which.

DETAILED DESCRIPTION OF EMBODIMENTS OF THE PRESENT INVENTION

Figure 1:
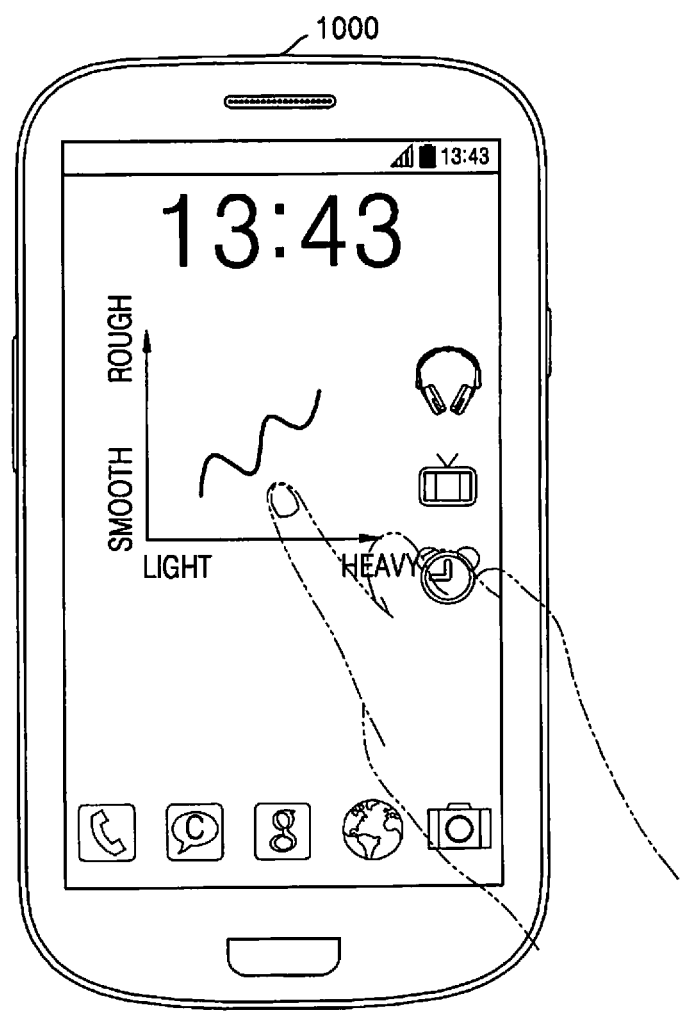
FIG. 1 is a diagram illustrating a device for generating a vibration on the basis of an input of an adjective space according to an embodiment of the present invention.

Reference will now be made in detail to embodiments of the present invention, which are illustrated in the accompanying drawings, wherein like reference numerals refer to like elements throughout. In this regard, the embodiments of the present invention may have different forms and should not be construed as being limited to the descriptions set forth herein. Accordingly, the embodiments of the present invention are described below, by referring to the figures, merely to explain aspects of the present invention.

Hereinafter, embodiments of the present invention are described in detail to be easily understood by those of ordinary skill in the art with reference to the accompanying drawings. The inventive concept of the present invention may, however, be embodied in many different forms and should not be construed as being limited to the embodiments set forth herein. In the accompanying drawings, a portion irrelevant to a description of the inventive concept of the present invention is omitted for clarity. Moreover, like reference numerals refer to like elements throughout.

In the description below, when one part (or element, device, etc.) is referred to as being "connected" to another part (or element, device, etc.), it should be understood that the former may be "directly connected" to the latter, or "electrically connected" to the latter via an intervening part (or element, device, etc.). Furthermore, when it is described that one comprises (or includes or has) some elements, it should be understood that it may comprise (or include or has) only those elements, or it may comprise (or include or have) other elements as well as those elements if there is no specific limitation.

In the present invention, an adjective denotes a word that represents a sensation felt through a vibration of a device, where the device generates a vibration by using a degree value of an adjective constituting each axis in an adjective space. In this case, the adjective includes, for example, heavy, light, rough, smooth, and fast, but is not limited thereto. That is, the adjective includes a word corresponding to a sensation which is felt via a vibration of a device, and the form of expression is not limited to the adjective. For example, an adjective space is constituted by using a word such as a noun "heaviness" or an adverb "heavily" instead of an adjective "heavy." Also, a degree value of an adjective denotes a value that represents a degree of an adjective. For example, as a degree value of "heavy" increases, a device generates a vibration which enables a user to more strongly feel a heavy sensation.

Moreover, in the present invention, a perceived intensity denotes an intensity in which a user perceives a vibration, and as a degree value of a perceived intensity increases, the device generates a vibration which enables a user to more strongly feel the vibration.

Moreover, in the present invention, a basic frequency and an overlap ratio are defined by at least two frequencies. For example, when at least two frequencies are used, the basic frequency may be a frequency that has a lesser value among a first frequency and a second frequency, and the overlap ratio has a value which is obtained by dividing a frequency, having a greater value among the first frequency and the second frequency, by the basic frequency. Also, the first frequency is a frequency of a first vibration, and the second frequency is a frequency of a second vibration.

Hereinafter, embodiments of the present invention will be described in detail with reference to the accompanying drawings.

FIG. 1 is a diagram illustrating a device 1000 for generating a vibration on the basis of an input of an adjective space according to an embodiment of the present invention.

Referring to FIG. 1, the device 1000 generates a vibration having a pattern based on data input to an adjective space.

The device 1000 provides a user interface, including an at least one-dimensional (1D) adjective space, to a user and generates a vibration element according to a user input, based on the data input to the adjective space.

Moreover, the device 1000 expresses the generated vibration element as a visual object and arranges a plurality of vibration elements, each displayed as a visual object, on a timeline to generate a vibration pattern in which the plurality of vibration elements are synthesized. That is, the device 1000 combines the plurality of vibration elements to generate a longer and more complicated vibration pattern.

The device 1000 determines a degree value of an adjective constituting each axis of the adjective space based on the data input to the adjective space and determines a frequency of vibration based on the determined degree value of the adjective. In addition, the device 1000 generates a vibration having the determined frequency.

Moreover, the device 1000 generates a plurality of vibrations for an adjective constituting a 1D adjective space by using a below-described vibration synthesis model. In this case, the device 1000 generates a vibration synthesis model for a plurality of adjectives. For example, in a two-dimensional (2D) adjective space, the device 1000 determines a first frequency and a second frequency for generating a plurality of vibrations by using the generated vibration synthesis model.

Moreover, the device 1000 determines an amplitude of vibration based on a degree value of a perceived intensity and generates a vibration having the determined amplitude. In this case, the degree value of the perceived intensity is input to the device 1000 by a user, but the present invention is not limited thereto. In addition, the perceived intensity of the input is visually provided to the user by expressing the perceived intensity of the input using a shape of an object.

Therefore, the user generates a vibration based on data which is intuitively input to an adjective space, expressing a cognitive feeling which a person can actually feel, by using a point or a line.

The device 1000 may be a smartphone, a smart television (TV), a Personal Computer (PC), a cellular phone, a Personal Digital Assistant (PDA), a laptop PC, a media player, a micro server, a Global Positioning System (GPS) apparatus, an e-book terminal, a digital broadcasting terminal, a navigation apparatus, a kiosk, a Moving Picture Experts Group Audio Layer 3 (MP3) player, a digital camera, a mobile computing device, or a non-mobile computing device, but is not limited thereto. The device 1000 includes various devices that generate a vibration feedback.

Hereinafter, a method of generating a vibration on the basis of data input to an adjective space is described in detail with reference to FIGS. 2 to 8. In addition, a vibration synthesis model and a frequency determination method for generating a vibration on the basis of data input to an adjective space is described in detail with reference to FIGS. 9 to 13.

Hereinafter, for convenience of description, a case in which a vibration is generated from a 2D adjective space using adjectives "heavy-light" and "rough-smooth" is described as an example. However, the present invention is not limited thereto. The adjectives may be replaced by other adjectives "bright-dark" and "warm-cold" which may be used to explain a haptic sense. Also, a vibration element may be generated from a 1D or 3D adjective space using one or three adjectives, in addition to the 2D adjective space.

Figure 2:
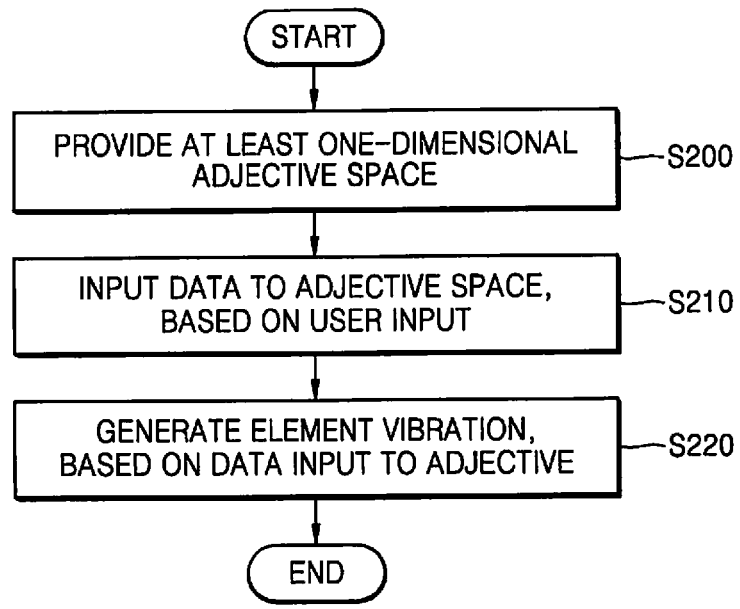
FIG. 2 is a flowchart of a method of generating a vibration element by a device on the basis of an input of an adjective space according to an embodiment of the present invention.

FIG. 2 is a flowchart of a method of generating by a device a vibration element on the basis of an input of an adjective space according to an embodiment of the present invention.

Figure 3:
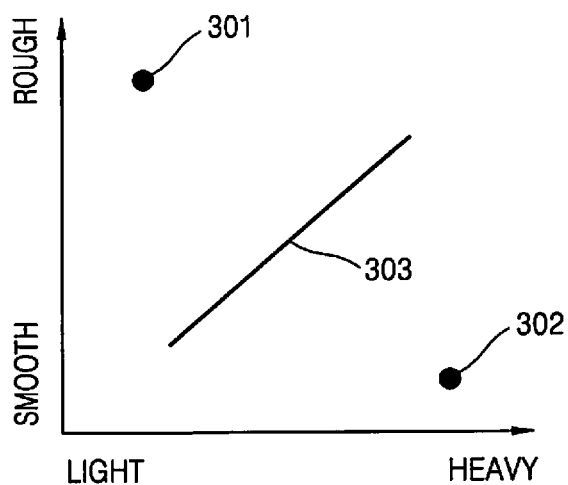
FIG. 3 is a chart illustrating a method of generating a vibration from an adjective space according to an embodiment of the present invention.

Referring to FIG. 2, in step S200, the device 1000, according to an embodiment of the present invention, provides an at least one-dimensional (1D) adjective space. For example, the device 1000 may provide a 2D adjective space, which is illustrated in FIG. 3, to a user.

In step S210, the device 1000, according to an embodiment of the present invention, inputs data to the adjective space based on a user input.

In this case, the data input to the adjective space may be a point, a line, or a free-hand curve.

Moreover, if a manner of inputting data to an adjective space is via a touch input, the device 1000 determines a perceived intensity of a vibration element which is to be generated based on a pressure or an area of the touch input, or by determining a reproduction time of a vibration element which is to be generated based on a touch input time. As another example, the device 1000 may provide the user with a user interface for editing an attribute of input point, line, or free-hand curve data, and determine a perceived intensity and a reproduction time by editing an attribute.

In step S220, the device 1000, according to an embodiment of the present invention, generates a vibration element based on the data input to the adjective space. That is, the device 1000 generates a vibration corresponding to a feeling at a certain position of an adjective space composed of at least one adjective axis. In this case, a detailed configuration for generating a vibration corresponding to a feeling of a certain adjective is described below with reference to FIGS. 9 to 13, but the present invention is not limited thereto. For example, a vibration corresponding to a feeling at a certain position of an adjective space may be experimentally or empirically determined and may be stored in a database.

FIG. 3 is a chart illustrating a method of generating a vibration from an adjective space according to an embodiment of the present invention.

The device 1000 receives a description of a vibration which a user desires to generate in the form of a line and a point in a 2D adjective space. In this case, a point is an input which allows a vibration, having a feeling of a corresponding position, to be continuously output for a certain time, and a line represents a change of a feeling of a vibration according to the line for a certain time.

Referring to FIG. 3, when a point 301 is input, the device 1000 generates a vibration of a light but rough feeling, and when a point 302 is input, the device 1000 generates a heavy but smooth vibration. In addition, when a line 303 is input, the device 1000 generates vibration which gives a light and smooth feeling at first, but is gradually and continuously changed to a heavy and rough feeling.

Data input to an adjective space is not limited to the point or the line illustrated in FIG. 3, but may be a more complicated figure or free-hand curve.

When the device 1000 is a PC, a mouse inputs data as illustrated in FIG. 3. Alternatively, when the device 1000 supports a touch input, data is input to an adjective space by using the touch input.

For example, the device 1000 including a touch input unit generates a vibration in which a feeling is changed according to a free-hand curve when the free-hand curve is drawn by a touch. A perceived intensity and a reproduction time of each vibration element is also set via a touch input. The device 1000 recognizes a pressure or an area of a touch input. Based on the recognized pressure or area, when a finger is strongly pushed or a finger touches a broad area, the device 1000 generates a vibration in which a perceived intensity is high, and when a finger is weakly pushed or a finger touches a narrow area, the device 1000 generates a vibration in which a perceived intensity is low. However, the present invention is not limited thereto. A method using a separate popup window may be used when determining a perceived intensity and a reproduction time.

Moreover, a perceived intensity and a reproduction time of a vibration element may be separately set or corrected in an operation of arranging a visual object representing the vibration element on a timeline. An example of arranging a vibration element on a timeline is described below with reference to FIG. 5.

Figure 4:
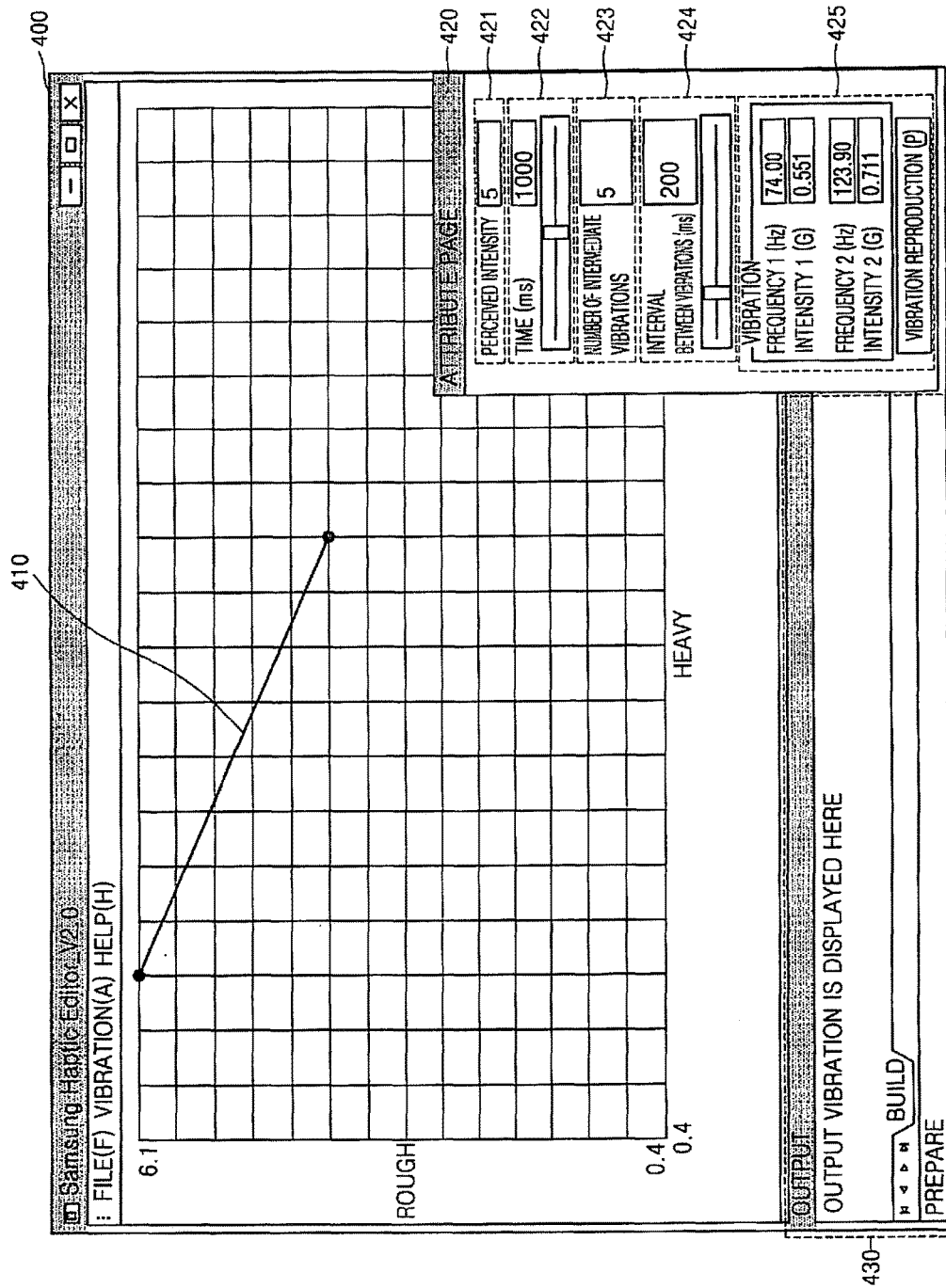
FIG. 4 is a diagram illustrating a method of generating a vibration from an adjective space according to an embodiment of the present invention.

FIG. 4 is a diagram illustrating a method of generating a vibration from an adjective space according to an embodiment of the present invention.

Referring to FIG. 4, when the device 1000 is a PC, the device 1000 provides a user with an editing window 400, in which a detailed setting is possible for generating a vibration from an adjective space.

For example, a line 410 having a length may be drawn in the editing window 400, and a vibration is generated which is continuously changed according to the drawn line 410. In this case, the line 410 is input by using a mouse or via a touch input. In addition, an output waveform in a frequency domain of the generated vibration is displayed on a side 430 of a screen, so that a form of the generated vibration is accurately determined.

Moreover, a perceived intensity 421 and a reproduction time 422 are additionally set by providing an attribute window 420 to a side of the screen. Also, the number of intermediate vibrations 423 and an interval between vibrations are set in detail, and a region 425 which directly receives a detailed characteristic (for example, a frequency and a perceived intensity) of a vibration to be generated is provided.

The device 1000 arranges a vibration element, which is generated as described above, on a timeline and generates a vibration for expressing a more complex pattern and feeling.

Figure 5:
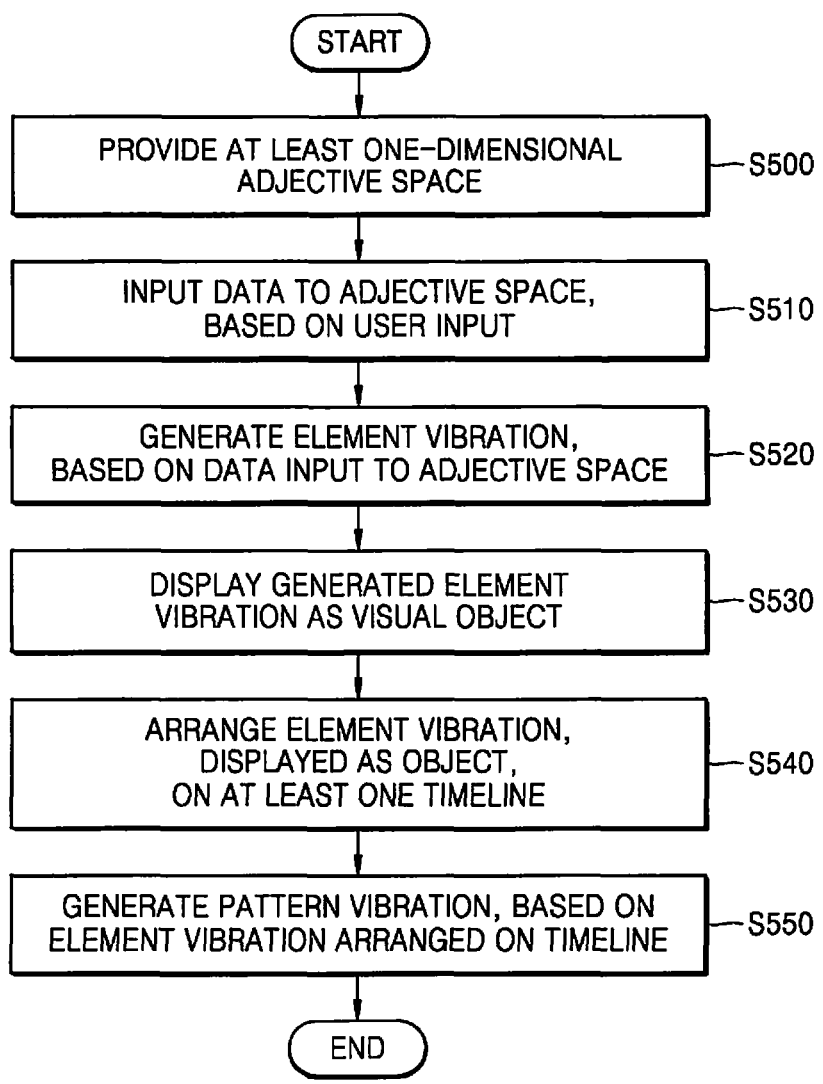
FIG. 5 is a flowchart of a method of generating a vibration pattern by a device on the basis of an input of an adjective space according to an embodiment of the present invention.

FIG. 5 is a flowchart of a method of generating a vibration pattern by a device on the basis of an input of an adjective space according to an embodiment of the present invention.

Steps S500 to S520 correspond to steps S200 to S220 of FIG. 2, and thus, their detailed descriptions are not provided.

In step S530, the device 1000, according to an embodiment of the present invention, displays a generated vibration element as a visual object. For example, the device 1000 visually displays the vibration element as a visual object corresponding to data input to an adjective space. That is, by displaying a visual object including a point, a line, or a curve input to an adjective space, the device 1000 displays the generated vibration element so that it may be intuitively perceived. That is, the visual object is a preview image or a thumbnail image of data input to the adjective space. For example, FIG. 6 illustrates an example in which a device, according to an embodiment of the present invention, displays a generated vibration element as a visual object.

Figure 6:
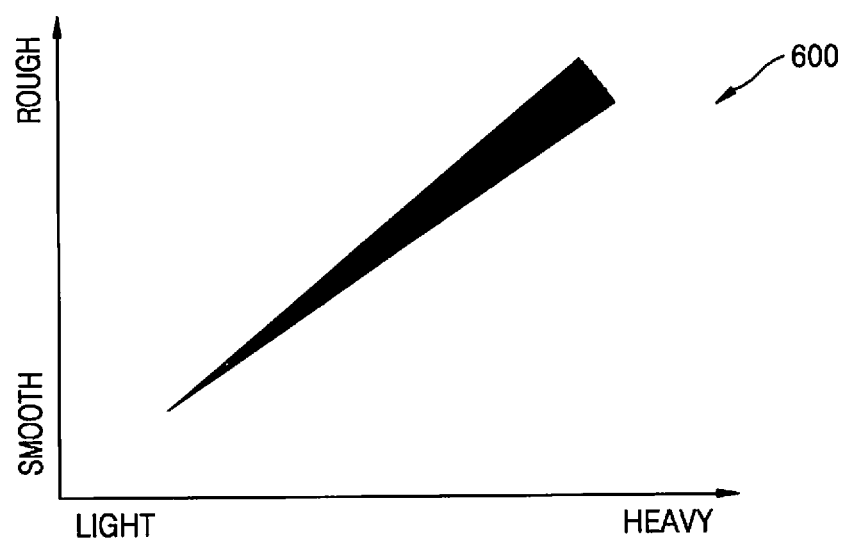
FIG. 6 is a chart that illustrates a display on a device of a generated a vibration element as a visual object according to an embodiment of the present invention.

A visual object 600 illustrated in FIG. 6 visually illustrates a vibration element which is changed from a smooth and light feeling to a heavy and rough feeling. In addition, a weak vibration being changed to a strong vibration may be intuitively expressed by expressing a perceived intensity of a vibration as a thickness of a line. The device 1000 displays a perceived intensity of a vibration element as a thickness of a line or a point included in a generated visual object.

As another example, the device 1000 displays a vibration element as a visual object corresponding to data of a color space. That is, the device 1000 makes each axis value of a 1D adjective space correspond to each axis value of a 1D color space, and changes data, input to an adjective space, to data of the color space, thereby displaying a visual object corresponding to the changed data of the color space.

Referring again to FIG. 5, in step S540, the device 1000, according to an embodiment of the present invention, arranges the vibration elements, displayed as the visual object, on at least one timeline. That is, a more complicated vibration pattern is generated by arranging vibration elements, which are generated by repeatedly performing steps S500 to S530, on a timeline as illustrated in FIG. 7 or FIG. 8.

In step S550, the device 1000, according to an embodiment of the present invention, generates a vibration pattern, based on the vibration element arranged on the timeline. Hereinafter, an example in which a vibration pattern is generated by arranging a visual object, which visually shows a vibration element on a timeline, will be described in detail with reference to FIGS. 7 and 8.

Figure 7:
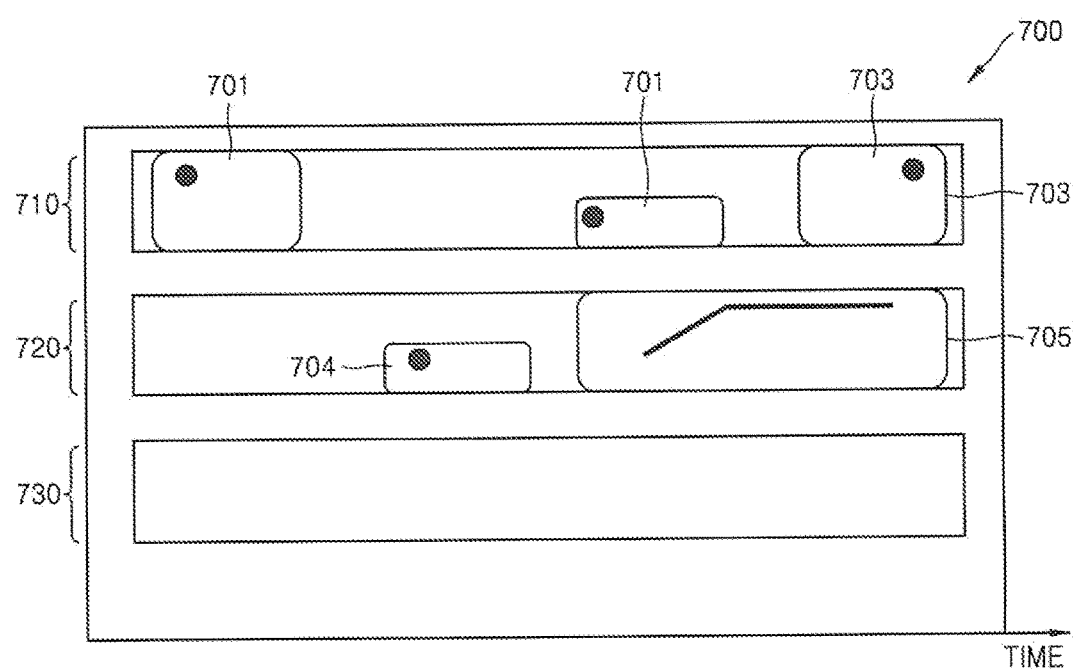
FIG. 7 is an illustration of an arrangement, by a device, of a vibration element displayed as a visual object on a timeline according to an embodiment of the present invention.
Figure 8:
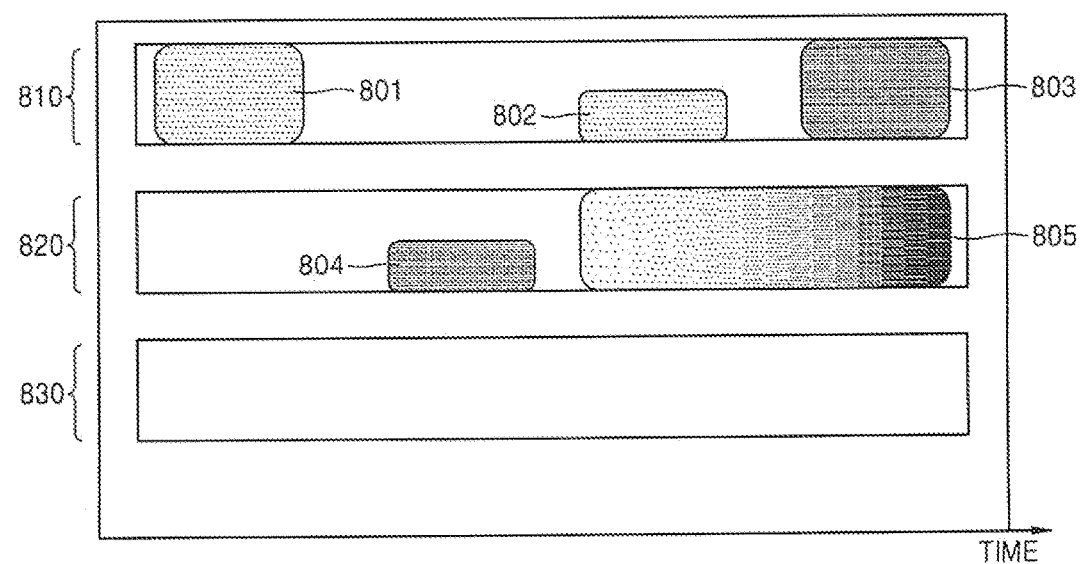
FIG. 8 is an illustration of an arrangement, by a device, of a vibration element displayed as a visual object on a timeline according to an embodiment of the present invention.

FIG. 7 is an illustration of an arrangement, by a device, of a vibration element displayed as a visual object on a timeline.

Referring to FIG. 7, a plurality of visual objects 701 to 705, which show respective vibration elements which correspond to data input to an adjective space, are inserted into at least one timeline 700. In the timeline 700, a horizontal length of each of the visual objects 701 to 705 represents a vibration reproduction time, where a vertical length represents a perceived intensity. For example, the visual objects 701 and 704 of FIG. 7 are vibration elements which each represent a rough and light vibration, but the visual object 701 has a high perceived intensity, and the visual object 704 has half of the perceived intensity of the visual object 701, which illustrates that the visual object 704 is more weakly output than the visual object 701. Also, the visual object 705 illustrates that the visual object 705 is output for a time that is approximately 2.5 times longer than the output time for vibration elements corresponding to each of the visual object 702 and the visual object 703. The device 1000 synthesizes vibration elements of a plurality of timelines 710, 720 and 730 into one vibration waveform, and generates one vibration pattern. However, the present invention is not limited thereto. For example, respective timelines are composed to correspond to different vibration generators, and a plurality of vibration generators may be driven for each timeline.

When the device 1000 supports a touch input, the visual objects 701 to 705 may be arranged on the timeline 700 or edited via a touch input.

When the device 1000 is a PC, the visual objects 701 to 705 may be arranged on the timeline 700 by using a mouse.

FIG. 8 is an illustration of an arrangement, by a device, of a vibration element displayed as a visual object on a timeline.

A plurality of visual objects 701 to 705 illustrated in FIG. 7 show that each vibration element is intuitively visualized by using a point or a line corresponding to data input to an adjective space, whereas the visual objects 801 to 805 illustrated in FIG. 8 show that each vibration element is intuitively visualized by using a color element.

Referring to FIG. 8, when it is difficult to sufficiently express information about a vibration element by using a visual object corresponding to data input to an adjective space because the size of a screen is too small like in a smartphone, a color may be used. For example, according to a Hue-Saturation-Brightness (HSB) color space, a color may be expressed by separately adjusting a value for Hue (H), a value for Saturation (S), and a value for Brightness (B). Therefore, data input to an adjective space may be changed to data of a color space by making values of H, S, and B correspond to values of respective axes of the adjective space, and may be displayed as a visual object corresponding to the data of the color space. For example, when making Hue (H) correspond to "smooth-rough" and making Saturation (S) correspond to "heavy-light", only Saturation (S) (e.g., the spacing of the dots within the visual objects) is changed in the visual objects 801 and 803 of FIG. 8, and thus, the visual object 803 which has a higher Saturation (S) than that of the visual object 801 shows a vibration element having a lighter feeling than that of visual object 801. Since Saturation (S) of the visual object 801 is the same as that of the visual object 802, the visual objects 801 and 802 show a vibration of a slightly heavy feeling, but since Hue (H) (e.g., height of the visual objects) of the visual object 801 is the same as that of the visual object 803, the visual objects 801 and 803 show vibrations having the same degree of roughness. In a vibration element shown as a line or a figure, where a feeling of vibration is continuously changed, vibration in which a feeling is continuously changed may be intuitively expressed by using a gradation technique as illustrated in the visual object 805.

Therefore, in a vibration generation method according to an embodiment of the present invention, a relationship between adjective information and generated vibration is displayed on a screen by using a visual expression and a figure, such as a point, a line, a circle, or a color, without being transferred via a complicated and expert-user interface, and thus, a user generates a vibration of a desired feeling easily, intuitively, and interestingly.

Hereinafter, a frequency determination method of generating a vibration on the basis of data input to an adjective space is described in detail with reference to FIGS. 9 to 13.

Figure 9:
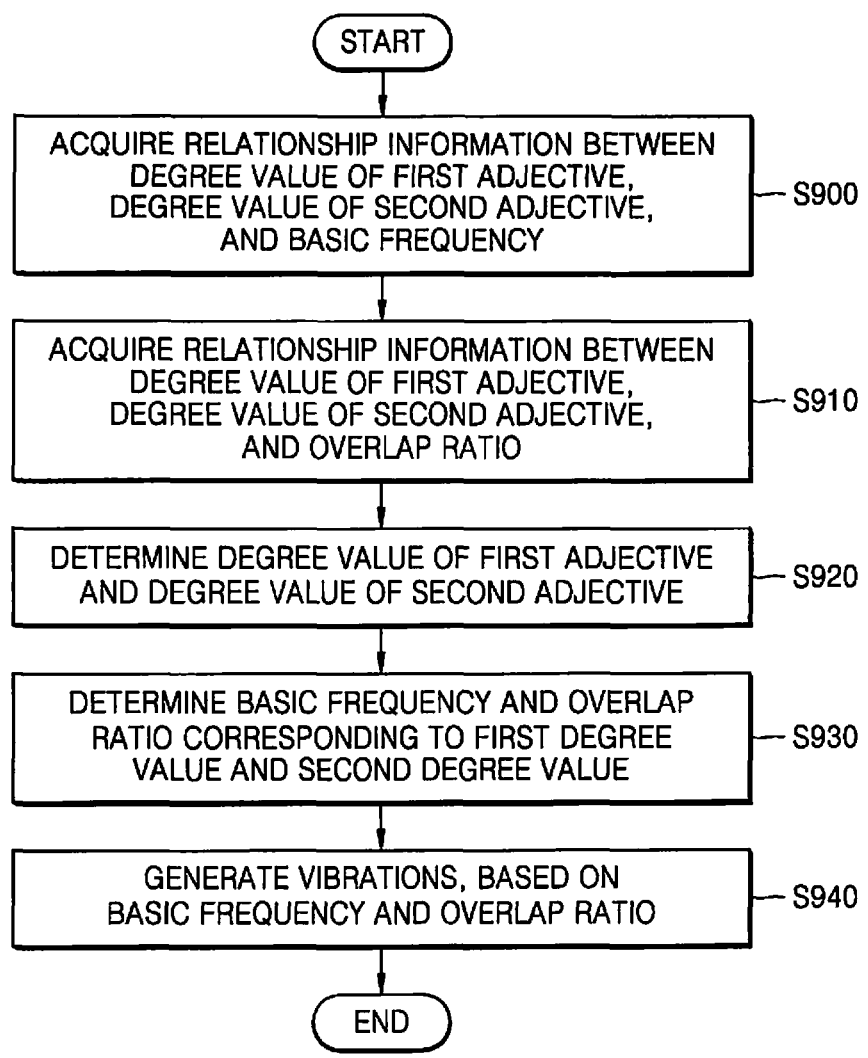
FIG. 9 is a flowchart of a method of generating a vibration synthesis model by a device according to an embodiment of the present invention.

FIG. 9 is a flowchart of a method of generating a vibration synthesis model by a device according to an embodiment of the present invention.

Figure 13:
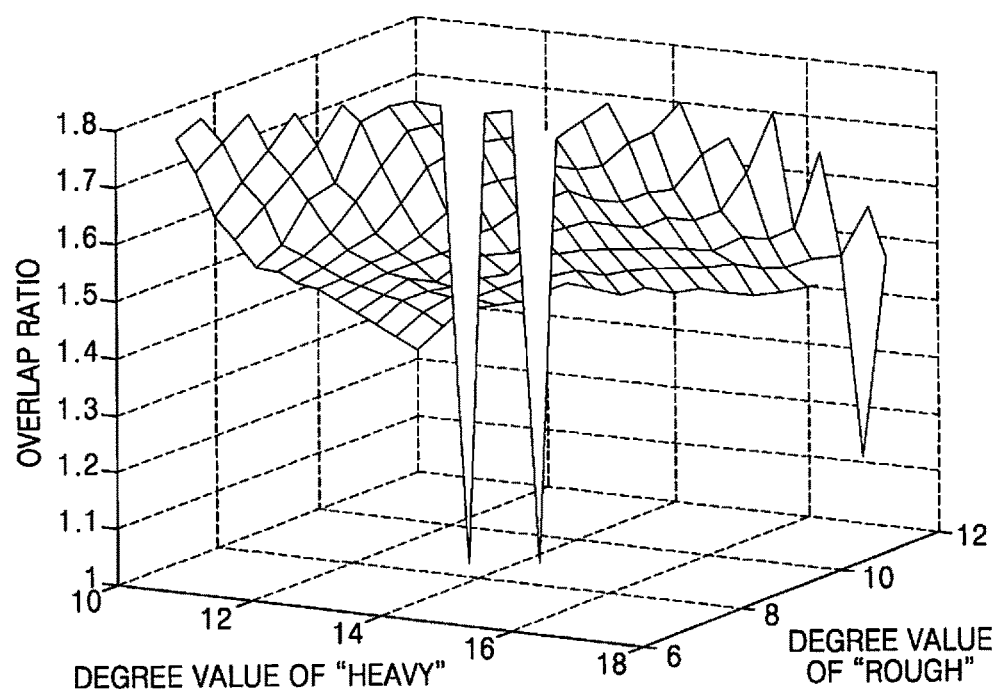
FIG. 13 is a graph illustrating an overlap ratio value with respect to a degree value of a first adjective and a degree value of a second adjective according to an embodiment of the present invention.

In step S900, the device 1000 acquires relationship information between a degree value of a first adjective, a degree value of a second adjective, and a basic frequency from data input to a 2D adjective space. The device 1000 receives from an external device, or directly generates, the relationship information between the degree value of the first adjective, the degree value of the second adjective, and the basic frequency. In addition, the relationship information between the degree value of the first adjective, the degree value of the second adjective, and the basic frequency may be a graph which shows a basic frequency value for the degree value of the first adjective and the degree value of the second adjective. For example, as shown in FIG. 13, the relationship information between the degree value of the first adjective, the degree value of the second adjective, and the basic frequency may be a graph which shows a basic frequency value for a degree value of an adjective "heavy" and a degree value of an adjective "rough."

Moreover, a graph which shows the basic frequency value for the degree value of the first adjective and the degree value of the second adjective may be generated by using a graph which shows a degree value of a first adjective for the basic frequency and an overlap ratio and a graph which shows a degree value of a second adjective for the basic frequency and the overlap ratio. For example, the graph of FIG. 12 is generated by synthesizing the graph of FIG. 10 and the graph of FIG. 11.

In step S910, the device 1000 acquires the relationship information between the degree value of the first adjective, the degree value of the second adjective, and an overlap ratio. The device 1000 receives from an external device, or directly generates, relationship information between the degree value of the first adjective, the degree value of the second adjective, and the overlap ratio. In addition, the relationship information between the degree value of the first adjective, the degree value of the second adjective, and the overlap ratio may be a graph which shows an overlap ratio value for the degree value of the first adjective and the degree value of the second adjective. For example, as shown in FIG. 12, the relationship information between the degree value of the first adjective, the degree value of the second adjective, and the overlap ratio may be a graph which shows an overlap ratio value for a degree value of an adjective "heavy" and a degree value of an adjective "rough".

Moreover, a graph which shows the overlap ratio value for the degree value of the first adjective and the degree value of the second adjective may be generated by using a graph which shows the degree value of the first adjective for the basic frequency and the overlap ratio and a graph which shows the degree value of the second adjective for the basic frequency and the overlap ratio. For example, the graph of FIG. 13 is generated by synthesizing the graph of FIG. 10 and the graph of FIG. 11.

In step S920, the device 1000 determines the degree value of the first adjective and the degree value of the second adjective. The device 1000 determines the degree value of the first adjective and the degree value of the second adjective based on a user input. In this case, the device 1000 displays a user interface, which includes a 2D adjective space for setting a degree value of an adjective, on a screen of the device 1000. In addition, the device 1000 determines the degree value of the first adjective and the degree value of the second adjective according to a user input corresponding to a point or a line for the displayed user interface. For example, the first adjective may be "heavy," and the second adjective may be "rough." The device 1000 determines a first degree value of the first adjective "heavy" as "15" and determines a second degree value of the second adjective "rough" as "10."

Moreover, the degree value of the first adjective and the degree value of the second adjective, which are determined in step S920, may be used for the device 1000 to generate a vibration of a feeling corresponding to the first adjective and the second adjective.

In step S930, the device 1000 determines a basic frequency and an overlap ratio which correspond to the first degree value and the second degree value. The device 1000 determines the basic frequency which corresponds to the first degree value and the second degree value based on the relationship information (acquired in step S900) between the degree value of the first adjective, the degree value of the second adjective, and the basic frequency. For example, the device 1000 inputs the first degree value and the second degree value, which are determined in step S920, to a graph which shows a basic frequency value for the degree value of the first adjective and the degree value of the second adjective, thereby acquiring the basic frequency which corresponds to the first degree value and the second degree value.

Moreover, the device 1000 determines the overlap ratio which corresponds to the first degree value and the second degree value based on the relationship information (acquired in step S910) between the degree value of the first adjective, the degree value of the second adjective, and the overlap ratio. For example, the device 1000 inputs the first degree value and the second degree value, which are determined in step S920, to a graph which shows an overlap ratio value for the degree value of the first adjective and the degree value of the second adjective, thereby acquiring the overlap ratio which corresponds to the first degree value and the second degree value.

In step S940, the device 1000 generates a vibration based on the basic frequency and the overlap ratio which are determined in step S930. The device 1000 determines a first frequency and a second frequency based on a relationship between the first frequency and the second frequency for the basic frequency and the overlap ratio.

In detail, the device 1000 substitutes the basic frequency and the overlap ratio into the following Equations (1) and (2) to acquire the first frequency and the second frequency, where min( ) is a function that returns a minimum value of the inputs to the function, and where max( ) is a function that returns a maximum value of the inputs to the function.

$$\text{basic frequency} = \min(\text{first frequency}, \text{second frequency}) \quad (1)$$

$$\text{overlap ratio} = \max(\text{first frequency}, \text{second frequency}) / \min(\text{first frequency}, \text{second frequency}) \quad (2)$$

Therefore, the device 1000 generates a vibration in which the first frequency is synthesized with the second frequency. Also, the device 1000 generates the vibration in consideration of a perceived intensity. The device 1000 synthesizes a first amplitude about the first frequency and a second amplitude about the second frequency in consideration of the perceived intensity. This is described in detail below with reference to FIG. 14.

Moreover, the device 1000 may generate vibration having the first frequency and the second frequency. The device 1000 may synthesize the first frequency and the second frequency to generate the vibration having the first frequency and the second frequency. The device 1000 may generate a first vibration having the first frequency and a second vibration having the second frequency. However, the present invention is not limited thereto.

A method of generating a vibration for two adjectives in a 2D adjective space is described above with reference to FIG. 9, but the present invention is not limited thereto. The device 1000 may generate a vibration from a 1D or a 3D adjective space.

Moreover, a method of generating a vibration by synthesizing two frequencies has been described above with reference to FIG. 9, but the present invention is not limited thereto. The device 1000 may generate a vibration by synthesizing three or more frequencies. In this case, a relationship between a basic frequency, an overlap ratio, and three or more frequencies is set via a method unlike that of FIG. 9. In addition, a relationship between three or more frequencies and an adjective is set via experimentation, unlike the method of FIG. 9.

Moreover, it has been described above with reference to FIG. 9 that the device 1000 generates one vibration, but the present invention is not limited thereto. The device 1000 generates a plurality of vibrations. In this case, each of the plurality of vibrations may have one or more frequencies.

Figure 10:
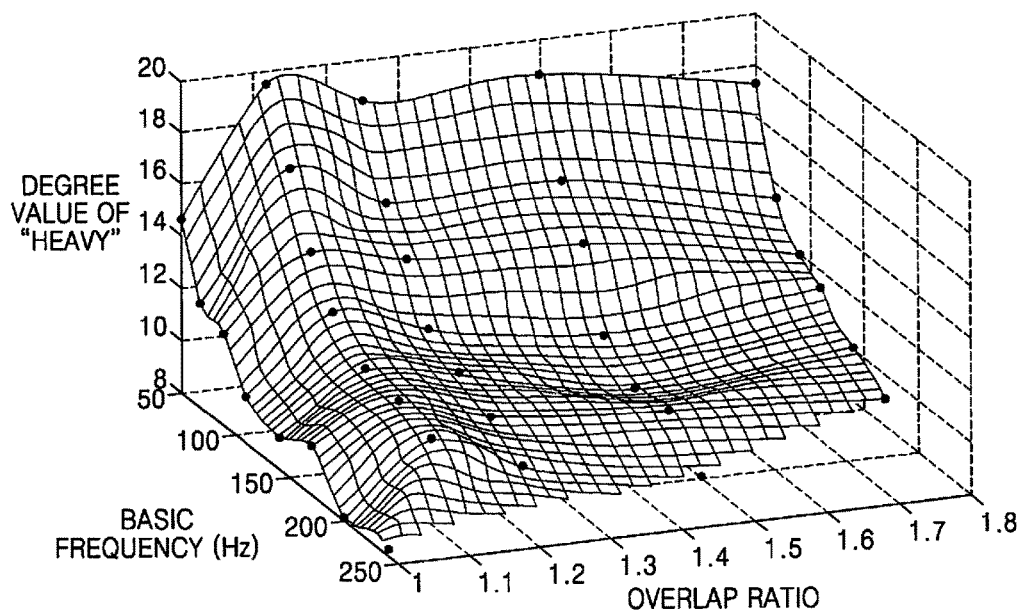
FIG. 10 is a graph illustrating a degree value of a first adjective with respect to a basic frequency and an overlap ratio according to an embodiment of the present invention.

FIG. 10 is a graph illustrating a degree value of a first adjective with respect to a basic frequency and an overlap ratio according to an embodiment of the present invention.

Referring to FIG. 10, a first adjective is "heavy," and as a degree value of the first adjective increases, a user will more strongly feel a heavy feeling. In addition, a graph which shows a degree value of "heavy" for a basic frequency and an overlap ratio may be generated via perception experimentation. For example, a graph which shows a degree value of the first adjective "heavy" for the basic frequency and the overlap ratio may be determined by experimentally measuring a degree of a heavy feeling for a physical attribute of a vibration.

Figure 11:
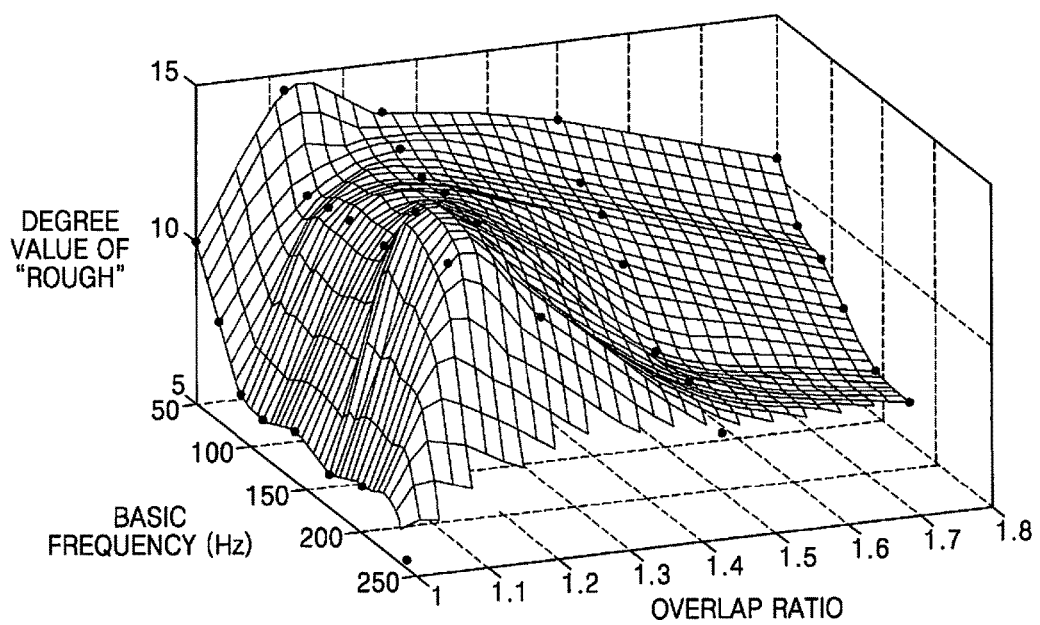
FIG. 11 is a graph illustrating a degree value of a second adjective with respect to a basic frequency and an overlap ratio according to an embodiment of the present invention.
Figure 12:
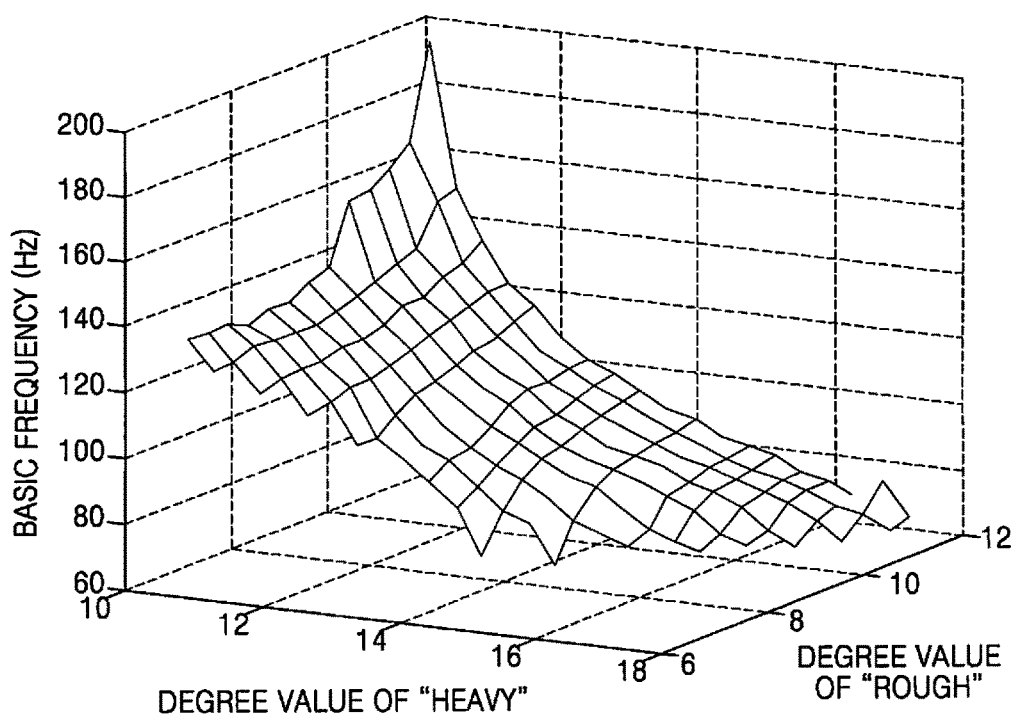
FIG. 12 is a graph illustrating a basic frequency value with respect to a degree value of a first adjective and a degree value of a second adjective according to an embodiment of the present invention.

FIG. 11 is a graph showing a degree value of a second adjective with respect to a basic frequency and an overlap ratio according to an embodiment of the present invention.

Referring to FIG. 11, a second adjective is "rough," and as a degree value of the second adjective increases, a user will more strongly feel a rough feeling. In addition, a graph which shows a degree value of "rough" for a basic frequency and an overlap ratio may be generated via perception experimentation. For example, a graph which shows a degree value of the second adjective "rough" for the basic frequency and the overlap ratio may be determined by experimentally measuring a degree of a heavy feeling for a physical attribute of a vibration.

FIG. 12 is a graph showing a basic frequency value with respect to a degree value of a first adjective and a degree value of a second adjective according to an embodiment of the present invention. In FIG. 12, a first adjective is "heavy," and a second adjective is "rough."

Moreover, the graph of FIG. 12 is generated based on the graph of FIG. 10 and the graph of FIG. 11. For example, the device 1000 generates a graph, which shows a basic frequency value for a degree value of "heavy" and a degree value of "rough," by using the graph of FIG. 10, which shows a degree value of "heavy" for a basic frequency and an overlap ratio, and the graph of FIG. 11, which shows a degree value of "rough" for the basic frequency and the overlap ratio.

Moreover, when the degree value of "heavy" and the degree value of "rough" are input from a user, the device 1000 may acquire a basic frequency value corresponding to the input degree values by using the graph of FIG. 12.

FIG. 13 is a graph showing an overlap ratio value with respect to a degree value of a first adjective and a degree value of a second adjective according to an embodiment of the present invention. In FIG. 13, a first adjective is "heavy" and a second adjective is "rough."

Moreover, the graph of FIG. 13 is generated based on the graph of FIG. 10 and the graph of FIG. 11. For example, the device 1000 generates a graph, which shows a basic frequency value for a degree value of "heavy" and a degree value of "rough," by using the graph of FIG. 10, which shows a degree value of "heavy" for a basic frequency and an overlap ratio, and the graph of FIG. 11, which shows a degree value of "rough" for the basic frequency and the overlap ratio.

Moreover, when the degree value of "heavy" and the degree value of "rough" are input from a user, the device 1000 acquires an overlap ratio value corresponding to the input degree values by using the graph of FIG. 13.

Figure 14:
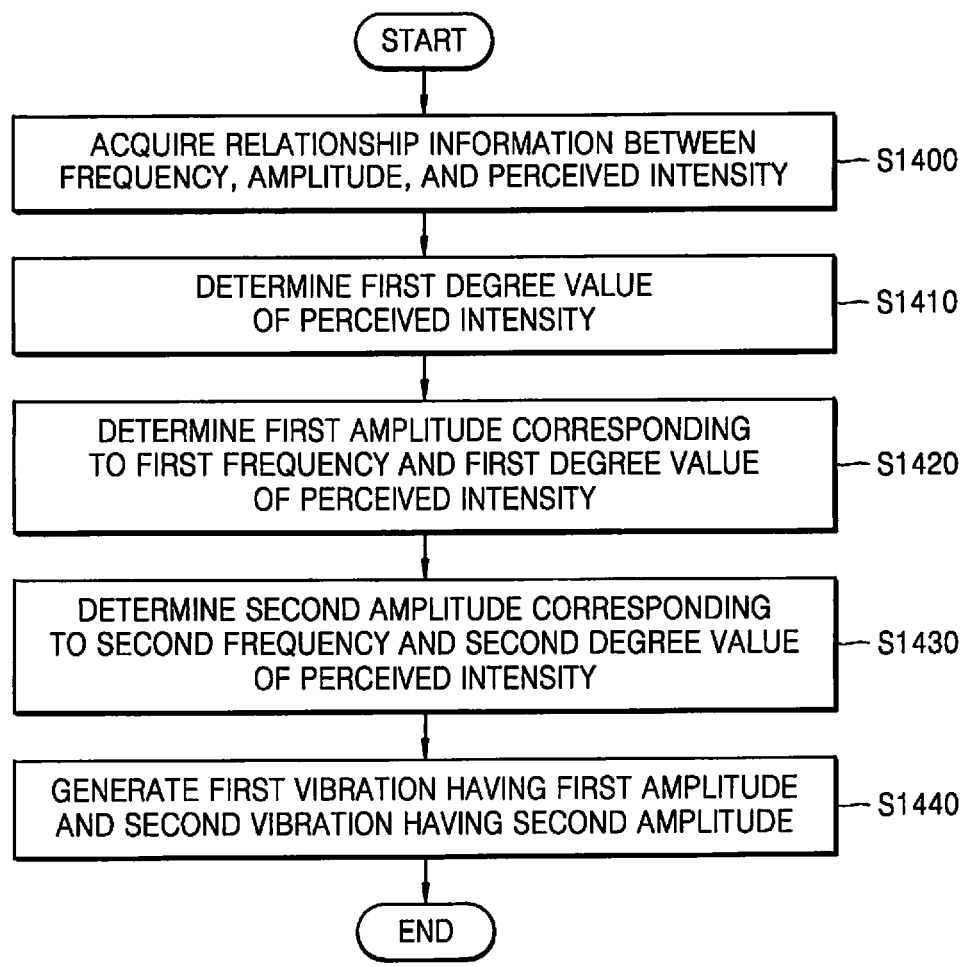
FIG. 14 is a flowchart of a method of generating, by a device, a plurality of vibrations on the basis of a degree value of a perceived intensity according to an embodiment of the present invention.

FIG. 14 is a flowchart of a method generating, by the device 1000, a plurality of vibrations on the basis of a degree value of a perceived intensity according to an embodiment of the present invention.

In step S1400, the device 1000 acquires relationship information about a frequency, amplitude, and a perceived intensity of a vibration. The relationship information about the frequency, amplitude, and perceived intensity of the vibration may be a graph which shows a perceived intensity for the frequency and amplitude of the vibration. Also, for example, a graph of FIG. 15 may be generated by experimentally measuring a perceived intensity for a physical attribute of a vibration.

Moreover, relationship information about a frequency "f," amplitude "φ," and a perceived intensity "p" is expressed, for example, by the following Equations (3) to (5):

$$k=225.2-276.7(\log_{10}f)^1+126.2(\log_{10}f)^2-20.3663(\log_{10}f)^3 \quad (3)$$

$$e=3.718-2.311(\log_{10}f)^1-3.8008(\log_{10}f)^2+0.9818(\log_{10}f)^3 \quad (4)$$

$$p=k\phi^e \quad (5)$$

In step S1410, the device 1000 determines a degree value of a perceived intensity. The device 1000 may determine the degree value of the perceived intensity based on a user input. In this case, the device 1000 determines the degree value of the perceived intensity according to a user input for a displayed user interface. However, the present invention is not limited thereto.

In step S1420, the device 1000 determines a first amplitude corresponding to a first frequency and a first degree value "$p_1$" of a perceived intensity. In step S1430, the device 1000 determines a second amplitude corresponding to a second frequency and a second degree value "$p_2$" of a perceived intensity. In this case, the first degree value "$p_1$" of the perceived intensity and the second degree value "$p_2$" of the perceived intensity may be determined with respect to a reference based on the degree value of the perceived intensity which is determined in step S1410 and Equation (6) below. Also, the first amplitude is an amplitude associated with the first frequency, and the second amplitude is an amplitude associated with the second frequency. Also, the first frequency and the second frequency are frequencies which are determined in step S220.

Moreover, the device 1000 determines the first amplitude and the second amplitude by using Equations (3) to (5) above and the following Equation (6). In this case, the following Equation (6) expresses a relationship between the first degree value "$p_1$" of the perceived intensity associated with the first frequency, the second degree value "$p_2$" of the perceived intensity associated with the second frequency, and a degree value "p" of a perceived intensity associated with the first and second frequencies.

$$p=\sqrt{p_1^2+p_2^2} \quad (6)$$

Moreover, the first degree value "$p_1$" of the perceived intensity associated with the first frequency and the second degree value "$p_2$" of the perceived intensity associated with the second frequency may be preset based on various references.

In step S1440, the device 1000 modulates an amplitude of a vibration in which the first frequency is synthesized with the second frequency based on the determined first amplitude and the determined second amplitude. Therefore, the device 1000 generates a vibration having the first frequency and the second frequency based on the first amplitude, the second amplitude, the first degree value "$p_1$" of the perceived intensity, and the second degree value "$p_2$" of the perceived intensity.

The device 1000 may generate a first vibration having the first amplitude and a second vibration having the second amplitude. In this case, the device 1000 generates the first vibration in order for the first vibration having the first frequency to have the first amplitude and generates the second vibration in order for the second vibration having the second frequency to have the second amplitude. Also, the device 1000 may simultaneously generate the first vibration and the second vibration within a certain time range.

Figure 15:
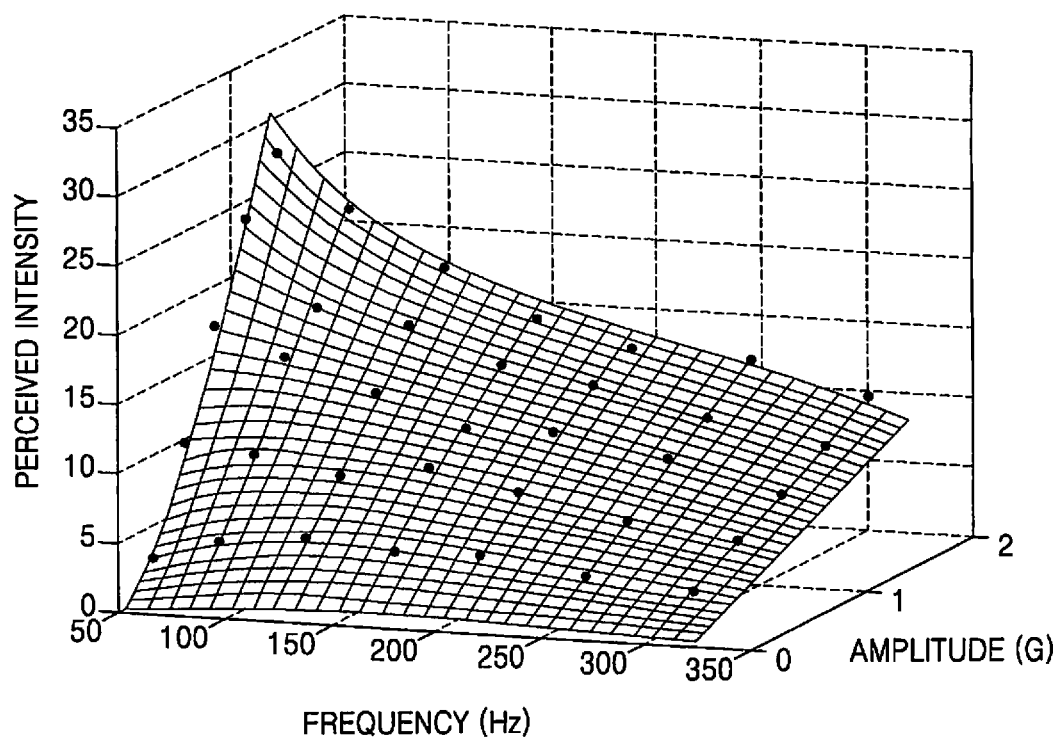
FIG. 15 is a graph illustrating a perceived intensity with respect to a frequency and an amplitude according to an embodiment of the present invention.

FIG. 15 is a graph illustrating a perceived intensity with respect to a frequency and an amplitude according to an embodiment of the present invention. The graph of FIG. 15 may be generated by experimentally measuring a perceived intensity for a physical attribute of a vibration.

Figure 16:
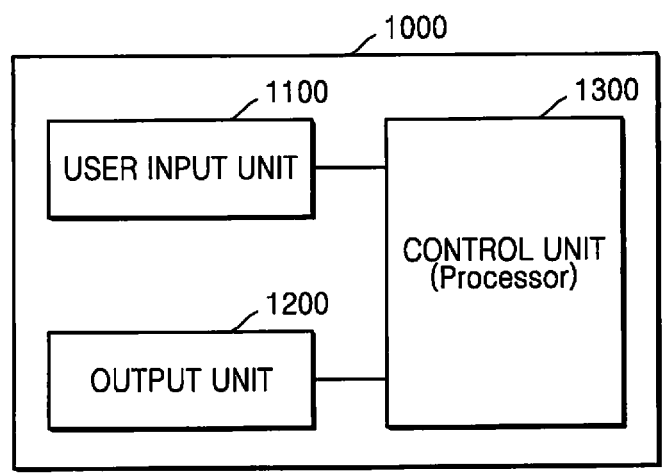
FIGS. 16 and 17 are each a block diagram of a device according to an embodiment of the present invention.
Figure 17:
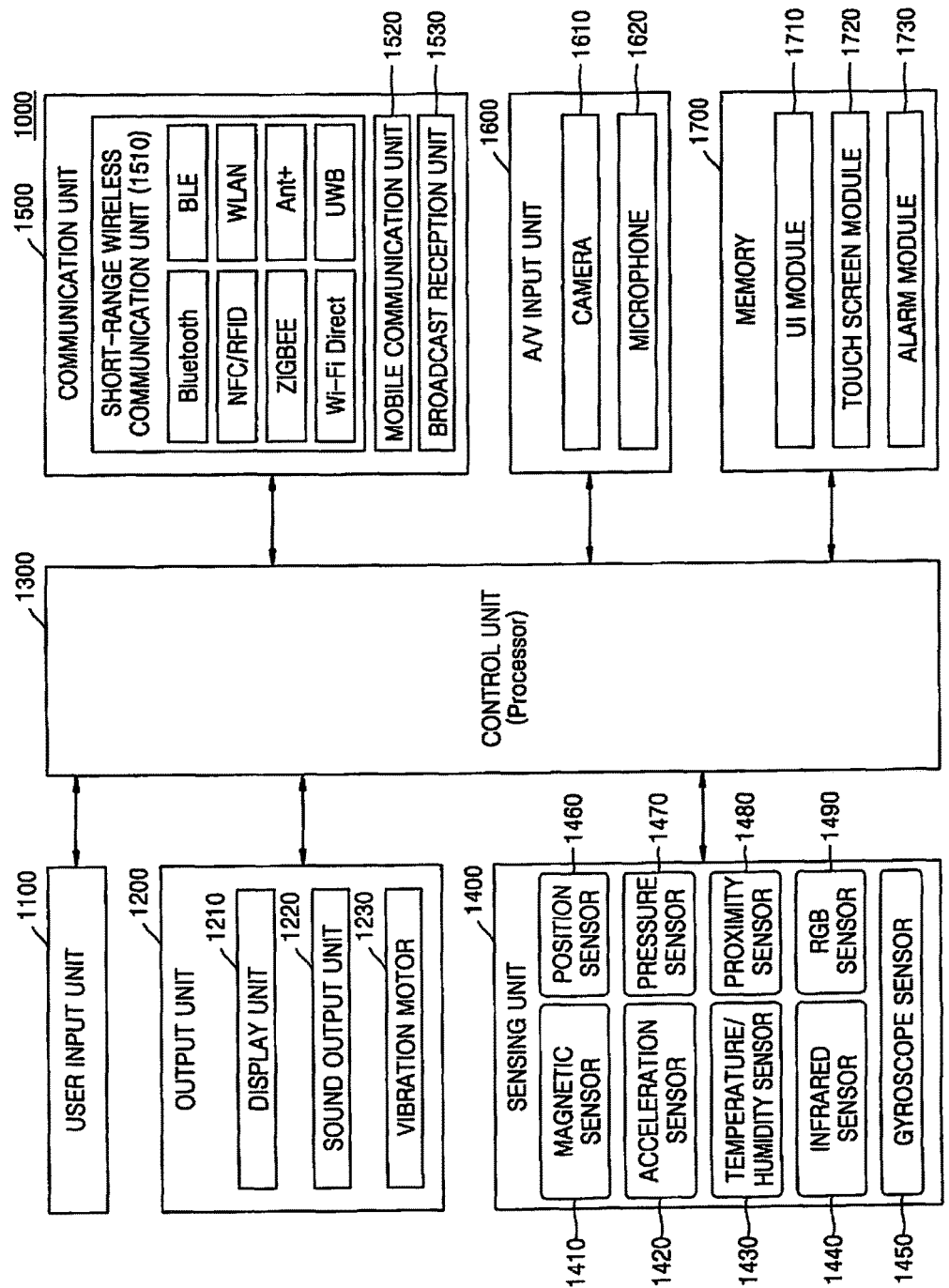

FIGS. 16 and 17 are each a block diagram of the device 1000 according to an embodiment of the present invention.

The device 1000 is a device for performing the above-described vibration generation method and may implement each of the above-described embodiments of the vibration generation method of the present invention.

As illustrated in FIG. 16, the device 1000 according to an embodiment of the present invention includes a user input unit 1100, an output unit 1200, and a control unit 1300. However, the illustrated elements are not the only elements that may be included in the device 1000. The device 1000 may include more elements or may include fewer elements.

For example, as illustrated in FIG. 17, the device 1000, according to an embodiment of the present invention, includes a sensing unit 1400, a communication unit 1500, an audio/video (A/V) input unit 1600, and a memory 1700 in addition to a user input unit 1100, an output unit 1200, and a control unit 1300.

The user input unit 1100 denotes a means for inputting data which is used for a user to control the device 1000. For example, the user input unit 1100 may include a keypad, a dome switch, a touch pad (for example, a contact capacitive type, a press resistive type, an infrared sensing type, a surface ultrasound conductive type, an integration tension measurement type, and a piezoelectric effect type), a jog wheel, and a jog switch, but is not limited thereto.

The user input unit 1100 is controlled by the control unit 1300 and receives a user's input. For example, the user input unit 1100 receives a point, a line, or a free-hand curve for an adjective space. Also, the control unit 1300 arranges a generated vibration element on a timeline to generate a desired vibration pattern.

The output unit 1200 is controlled by the control unit 1300 and outputs an audio signal, a video signal, or a vibration signal. The output unit 1200 includes a display unit 1210, a sound output unit 1220, and a vibration generation unit 1230.

The display unit 1210 is controlled by the control unit 1300 and displays information processed by the device 1000. The display unit 1210 displays a user interface for receiving a setting value which is used for the device 1000 to generate a vibration.

When the display unit 1210 includes a touch screen in which the display unit 1210 and a touch pad form a layer structure, the display unit 1210 is used as an input device in addition to an output device. The display unit 1210 includes at least one display selected from a Liquid Crystal Display (LCD), a thin film transistor-LCD, an organic light-emitting diode display, a flexible display, a 3D display, and an electrophoretic display. In addition, the device 1000 includes two or more display units 1210 depending on an implementation type of the device 1000. In this case, the two or more display units 1210 are disposed to face each other by using a hinge.

The sound output unit 1220 outputs audio data which is received from the communication unit 1500 or stored in the memory 1700. In addition, the sound output unit 1220 outputs a sound signal associated with a function (for example, a call-signal reception sound, a message reception sound, and an alarm sound) performed by the device 1000. The sound output unit 1220 includes a speaker and a buzzer.

The vibration generation unit 1230 is controlled by the control unit 1300 and outputs a vibration signal. The vibration generation unit 1230 includes a vibration motor, but is not limited thereto. The vibration generation unit 1230 generates a vibration having at least one frequency corresponding to a generated vibration element or vibration pattern. The vibration generation unit 1230 generates, for example, a vibration having a first frequency and a second frequency which corresponds to data input to a 2D adjective space. According to an embodiment of the present invention, when the device 1000 is a PC and performs only a function of generating a vibration element and a vibration pattern vibration, the device 1000 does not include the vibration generation unit 1230.

The control unit 1300 controls the overall operation of the device 1000. For example, the control unit 1300 executes programs stored in the memory 1700 to control the user input unit 1100, the output unit 1200, the sensing unit 1400, the communication unit 1500, the A/V input unit 1600, and the memory 1700.

In detail, the control unit 1300 at least provides a user with a 1D adjective space. For example, the 2D adjective space illustrated in FIG. 3 may be displayed to the user.

Therefore, the control unit 1300 receives data input to an adjective space via the user input unit 1100 and generates a vibration element based on the received data.

For example, the device 1000 generates a vibration corresponding to a feeling at a certain position of an adjective space composed of two adjective axes. Alternatively, the device 1000 generates a vibration element in which an adjective feeling is changed for a predetermined time.

Moreover, the control unit 1300 expresses the generated element vibration as a visual object. For example, the control unit 1300 visually expresses the vibration element as a visual object corresponding to the data input to the adjective space. That is, the control unit 1300 expresses the generated vibration element in a form that may be comprehended intuitively by displaying a visual object which includes a point, a line, or a free-hand curve input to an adjective space.

As another example, the control unit 1300 expresses a vibration element as a visual object corresponding to data of a color space. That is, the control unit 1300 makes each axis value of a 1D adjective space correspond to each axis value of a 1D color space and changes data input to an adjective space to data of the color space, thereby displaying a visual object corresponding to the changed data of the color space.

Moreover, the control unit 1300 arranges the vibration element displayed as the visual object on at least one timeline. That is, a more complicated vibration pattern may be generated by arranging vibration elements which are generated by repeatedly performing steps S500 to S530 of FIG. 5 on the timeline as illustrated in FIG. 7 or 8.

Moreover, the control unit 1300 may preset and store a plurality of basic frequencies and a plurality of overlap ratios corresponding to a plurality of adjectives and degree values of the plurality of adjectives, and thus may generate a vibration element having a frequency corresponding to the data input to the adjective space. In addition, the control unit 1300 arranges the vibration element on a timeline to generate a vibration pattern.

The sensing unit 1400 senses a state of the device 1000 or a peripheral state of the device 1000 and transfers sensed information to the control unit 1300. The sensing unit 1400 includes at least one sensor selected from a magnetic sensor 1410, an acceleration sensor 1420, a temperature/humidity sensor 1430, an infrared sensor 1440, a gyroscope sensor 1450, a position sensor (for example, a Global Positioning System (GPS)) 1460, a pressure sensor 1470, a proximity sensor 1480, and an Red-Blue-Green (RGB) sensor (e.g. an illuminance sensor) 1490, but is not limited thereto. A function of each of the sensors may be intuitively inferred from a name by one of ordinary skill in the art, and thus, its detailed description is not provided.

Moreover, the sensing unit 1400 may include a sensor which senses a touch input by an input tool and a sensor that senses a touch input by a user. In this case, the sensor that senses the touch input by the user may be included in a touch screen or a touch pad. Also, the sensor which senses the touch input by an input tool may be disposed under the touch screen or the touch pad, or may be included in a touch screen or a touch pad.

The communication unit 1500 is controlled by the control unit 1300 and receives various pieces of information from an external device. The communication unit 1500 receives relationship information between a degree value of a first adjective, a degree value of a second adjective, and a basic frequency from an external device. In addition, the communication unit 1500 receives relationship information between the degree value of the first adjective, the degree value of the second adjective, and an overlap ratio from an external device.

Moreover, the communication unit 1500 includes one or more elements which enable communication between the device 1000 and an external device. For example, the communication unit 1500 includes a short-range wireless communication unit 1510, a mobile communication unit 1520, and a broadcast reception unit 1530.

The short-range wireless communication unit 1510 includes a Bluetooth communication unit, a Bluetooth Low Energy (BLE) communication unit, a Near Field Communication (NFC) unit/Radio Frequency IDentification (RFID) unit, a Wireless Local Area Network (WLAN), a Wireless Fidelity (Wi-Fi) communication unit, a Zigbee communication unit, an Infrared Data Association (IrDA) communication unit, a Wi-Fi Direct (WFD) communication unit, an Ultra-WideBand (UWB) communication unit, or an Ant+ communication unit, but is not limited thereto.

The mobile communication unit 1520 transmits or receives a wireless signal to or from at least one device selected from a base station, an external terminal, and a server over a mobile communication network. In this case, the wireless signal may include various types of data based on transmission or reception of a voice call signal, a video call signal, or a letter/multimedia message.

The broadcast reception unit 1530 receives a broadcast signal and/or broadcast-related information from an external source via a broadcast channel. The broadcast channel includes a satellite channel and a terrestrial channel. The device 1000 may exclude the broadcast reception unit 1530, according to an embodiment of the present invention.

The A/V input unit 1600 receives an audio signal or a video signal and may include a camera 1610 and a microphone 1620. The camera 1610 obtains a picture, such as a still image or a moving image, via an image sensor in a video call mode or a photographing mode. An image captured via an image sensor is processed by the control unit 1300 or a separate image processor.

The memory 1700 stores a program for operating the control unit 1300, and stores input/output data.

The memory 1700 includes at least one type of storage medium selected from a flash memory type, a hard disk type, a multimedia card micro type, a card type memory (for example, an Secure Digital (SD) memory or an eXtreme Digital (XD) memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk.

A plurality of programs stored in the memory 1700 may be classified into a plurality of modules depending on their functions, and, for example, may be classified into a User Interface (UI) module 1710, a touch screen module 1720, and an alarm module 1730.

The UI module 1710 provides a specialized UI and Graphic UI (GUI), which cooperates with the device 1000 for each application. The touch screen module 1720 senses a touch gesture of a user which is applied to a touch screen and transfers information about the touch gesture to the control unit 1300. The touch screen module 1720, according to an embodiment of the present invention, recognizes and analyzes a touch code. The touch screen module 1720 may be configured with separate hardware including a controller.

Various sensors are provided in or near a touch screen for detecting a touch or a proximity touch of the touch screen. An example of a sensor for sensing a touch of a touch screen is a tactile sensor. The tactile sensor denotes a sensor that senses a touch by a certain object by a certain degree, which a user feels, or more. The tactile sensor senses various pieces of information such as a roughness of a touched surface, a stiffness of a touched object, a temperature of a touched point, etc.

Moreover, an example of a sensor for sensing a touch of the touch screen is a proximity sensor. The proximity sensor denotes a sensor that detects an object approaching a detection surface or an object near the detection surface by using an electromagnetic force or infrared light without any mechanical contact. Examples of the proximity sensor include a transmissive photosensor, a directly reflective photosensor, a mirror reflective photosensor, a high frequency oscillation-type proximity sensor, a capacitive proximity sensor, a magnetic proximity sensor, and an infrared proximity sensor.

Examples of a users touch gesture described herein includes a tap, a touch and hold, a double tap, a drag, panning, a flick, a drag and drop, and a swipe.

The alarm module 1730 generates a signal for notifying of an event which occurs in the device 1000. Examples of an event which occurs in the device 1000 include reception of a call signal, reception of a message, an input of a key signal, and notification of a schedule. The alarm module 1730 outputs a notice signal in a video signal type via the display unit 1210, a notice signal in an audio signal type via the sound output unit 1220, and a notice signal in a vibration signal type via the vibration generation unit 1230.

Therefore, the vibration generation method 1230, according to an embodiment of the present invention, generates a vibration, without using a frequency and amplitude of the vibration, based on data input to an adjective space that expresses a cognitive feeling actually felt by a person. For example, how heavy, how rough, and how bright or dark a vibration feels are displayed on a screen. That is, a relationship between adjective information and generated vibration is displayed on a screen by using a visual expression and a figure, such as a point, a line, a free-hand curve, a circle, or a color, without being transferred via a complicated and expert-user interface, and thus, a user generates a vibration of a desired feeling easily, intuitively, and interestingly.

The vibration generation method according to an embodiment of the present invention may be used as a vibration generation tool which is implemented in a PC and is used by experts. Alternatively, the vibration generation method according to an embodiment of the present invention may be implemented as an application of a smartphone or a tablet PC, and thus, general users may easily create and share a vibration pattern of a desired feeling.

The embodiments of the present invention may be implemented in the form of a non-transitory computer-readable storage medium that includes computer executable instructions, such as program modules, being executed by a computer. Non-transitory computer-readable media may be any available media that may be accessed by the computer and includes both volatile and nonvolatile media, and removable and non-removable media. In addition, the non-transitory computer-readable media may include computer storage media and communication media. Computer storage media includes both the volatile and non-volatile and the removable and non-removable media implemented as any method or technology for storage of information such as computer readable instructions, data structures, program modules, or other data. The medium of communication is typically computer-readable instructions, other data in a modulated data signal such as data structures, or program modules, or another transport mechanism that includes any information delivery media.

It should be understood that the embodiments of the present invention described herein should be considered in a descriptive sense only and not for purposes of limitation. Descriptions of features or aspects within each embodiment of the present invention should typically be considered as available for other similar features or aspects in other embodiments of the present invention.

While one or more embodiments of the present invention have been described with reference to the figures, it will be understood by those of ordinary skill in the art that various changes in form and details may be made therein without departing from the scope and spirit of the present invention as defined by the appended claims and their equivalents.

What is claimed is:

1. A method of generating a vibration by using an adjective space displayed on a screen of a device, the method performed by the device and comprising:

providing an at least one-dimensional adjective space to be used for determining at least one degree of at least one property represented by at least one adjective indication;

inputting data to the at least one-dimensional adjective space based on a first user input;

determining the at least one degree of the at least one property based on the data input to the at least one-dimensional adjective space; and generating a vibration element based on the determination.

2. The method of claim 1, further comprising displaying the generated vibration element as a visual object.

3. The method of claim 2, further comprising:

arranging the vibration element displayed as the visual object on at least one timeline based on a second user input; and generating a vibration pattern based on the vibration element arranged on the at least one timeline.

4. The method of claim 3, wherein, in the vibration element displayed as the visual object arranged on the at least one timeline, a reproduction time is expressed as a horizontal length of the visual object, and a vibration intensity is expressed as a vertical height of the visual object.

5. A device for generating a vibration by using an adjective space displayed on a screen of the device, the device comprising:

a control unit configured to provide an at least one-dimensional adjective space to be used for determining at least one degree of at least one property represented by at least one adjective indication; and a user input unit configured to receive data input to the at least one-dimensional adjective space, wherein the control unit is further configured to determine the at least one degree of the at least one property based on the data input to the at least one-dimensional adjective space and generate a vibration element based on the determination.

6. The device of claim 5, wherein the control unit is further configured to control a display of the generated vibration element as a visual object.

7. The device of claim 6, wherein the control unit is further configured to provide at least one timeline, arrange the vibration element displayed as the visual object on the at least one timeline via the user input unit, and generate a vibration pattern based on the vibration element arranged on the at least one timeline.

8. The device of claim 7, wherein, in the vibration element displayed as the visual object arranged on the at least one timeline, a reproduction time is expressed as a horizontal length, and a vibration intensity is expressed as a vertical height.

9. A non-transitory computer-readable storage medium storing one or more programs including instructions for executing a method in which a device generates a vibration by using an adjective space displayed on a screen of the device, wherein the method comprises:

providing an at least one-dimensional adjective space to be used for determining at least one degree of at least one property represented by at least one adjective indication;

inputting data to the at least one-dimensional adjective space based on a user input;

determining the at least one degree of the at least one property based on the data input to the at least one-dimensional adjective space; and generating a vibration element based on the determination.

* * * * *